United States Patent
Sevindik (10) Patent No.: US 10,313,143 B1
(45) Date of Patent: Jun. 4, 2019

(54) WIRELESS COMMUNICATION SYSTEM TO PROVIDE BUFFERING IN A SINGLE FREQUENCY NETWORK

(71) Applicant: Sprint Communications Company L.P., Overland Park, KS (US)

(72) Inventor: Volkan Sevindik, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 759 days.

(21) Appl. No.: 14/628,361

(22) Filed: Feb. 23, 2015

(51) Int. Cl.
  *H04W 88/08* (2009.01)
  *H04L 12/18* (2006.01)
  *H04W 72/00* (2009.01)

(52) U.S. Cl.
  CPC ....... *H04L 12/1881* (2013.01); *H04W 72/005* (2013.01); *H04W 88/08* (2013.01)

(58) Field of Classification Search
  CPC ....... H04W 72/005; H04W 4/06; H04W 8/26; H04L 12/189; H04L 12/185
  See application file for complete search history.

(56) References Cited

U.S. PATENT DOCUMENTS

| | | | | |
|---|---|---|---|---|
| 7,583,653 | B2 * | 9/2009 | Adjakple | H04W 56/0015 370/350 |
| 8,509,240 | B2 * | 8/2013 | Wang | H04H 20/67 370/394 |
| 9,693,372 | B2 * | 6/2017 | Wang | H04W 72/005 |
| 2010/0110958 | A1 * | 5/2010 | Racz | H04L 12/189 370/312 |
| 2012/0063447 | A1 * | 3/2012 | Tyrrell | H04W 56/00 370/350 |
| 2012/0099468 | A1 * | 4/2012 | Wang | H04W 28/06 370/252 |
| 2012/0113886 | A1 * | 5/2012 | Zhang | H04W 72/005 370/312 |
| 2012/0201184 | A1 * | 8/2012 | Ai | H04L 12/189 370/312 |
| 2014/0177583 | A1 | 6/2014 | Aso et al. | |
| 2015/0063188 | A1 * | 3/2015 | Kanesalingam | H04W 72/005 370/312 |

(Continued)

FOREIGN PATENT DOCUMENTS

WO   WO 2014007692 A1 *  1/2014  ............ H04W 7/005

OTHER PUBLICATIONS

WO2014/007692, Xiaoling Wang et al., Jan 9, 2014 Abstract Translation.*

*Primary Examiner* — Mark H Rinehart
*Assistant Examiner* — Sanjay K Dewan (57) ABSTRACT

A wireless communication system synchronizes a Single Frequency Network (SFN). The wireless communication system includes a multicast server system that transmits multimedia content to wireless access points. The wireless access points determine and transmit SFN transmit time information to the multicast server system. The multicast server system uses the SFN transmit time information to determine individual buffering information for each of the wireless access points. The multicast server system adjusts a buffer delay for each individual wireless access points using the individual buffering information. The multicast server system transmits the multimedia content to wireless access points.

12 Claims, 6 Drawing Sheets

(56) References Cited

U.S. PATENT DOCUMENTS

2016/0191287 A1* 6/2016 Conrad ............... H04L 27/2607
370/343
2017/0230931 A1* 8/2017 Ubeda Castellanos .....................
H04W 64/006

* cited by examiner

WIRELESS COMMUNICATION SYSTEM TO PROVIDE BUFFERING IN A SINGLE FREQUENCY NETWORK

TECHNICAL BACKGROUND

Wireless communications have become increasingly prominent for sending and receiving information. For example, individuals may utilize a wireless communication device for voice communications, video calls, text messaging, email, research, entertainment, and/or for conducting critical business transactions. Wireless communication devices may use wireless protocols, such as Long Term Evolution (LTE), Evolution Data Optimized (EVDO), Code Division Multiple Access (CDMA), Global System for Mobile communications (GSM), High Speed Packet Access (HSPA), and the like to communicate over wireless communication networks.

Wireless communication networks comprise a collection of wireless access nodes connected together with communication links. A wireless communication network may also be connected to other communication networks. Wireless communication systems, such as cellular voice and data networks, typically include multiple wireless access nodes spread over a geographic area through which wireless communication devices can register and receive wireless access to wireless communication services.

A Single Frequency Network (SFN) is a broadcast network where several access points simultaneously transmit the same signal over the same frequency channel. In an SFN the signal may be amplified and the SFN may maintain overall coverage even in the event of the outage of one or more access points. The wireless access nodes in a wireless communication network may be used to implement an SFN. SFNs are useful to simultaneously transmit the same content to multiple users located in a geographic area. For example, an SFN may stream an audio or video broadcast, like a sporting event. It is important to synchronize the access points, as unsynchronized frames will cause interference in the SFN. Synchronization is also necessary to ensure that as users move around within the coverage area of the SFN, the content is synchronized no matter which access point the user is connected to.

OVERVIEW

Examples disclosed herein provide a system, method, hardware, and software to provide buffering in a Single Frequency Network (SFN). In one instance, the method includes a multicast server system that transmits multimedia content to wireless access points. The wireless access points determine and transmit SFN transmit time information to the multicast server system. The method further includes the multicast server system using the SFN transmit time information to determine individual buffering information for each of the wireless access points. The method includes the multicast server system adjusting a buffer delay for each individual wireless access point using the individual buffering information and transmitting the multimedia content to the wireless access points.

In another example, a wireless communication system provides buffering in a Single Frequency Network (SFN). The wireless communication system includes a multicast server system that transmits multimedia content to wireless access points. The wireless access points determine and transmit SFN transmit time information to the multicast server system. The multicast server system uses the SFN transmit time information to determine individual buffering information for each of the wireless access points. The method includes the multicast server system adjusting a buffer delay for each individual wireless access point using the individual buffering information and transmitting the multimedia content to the wireless access points.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
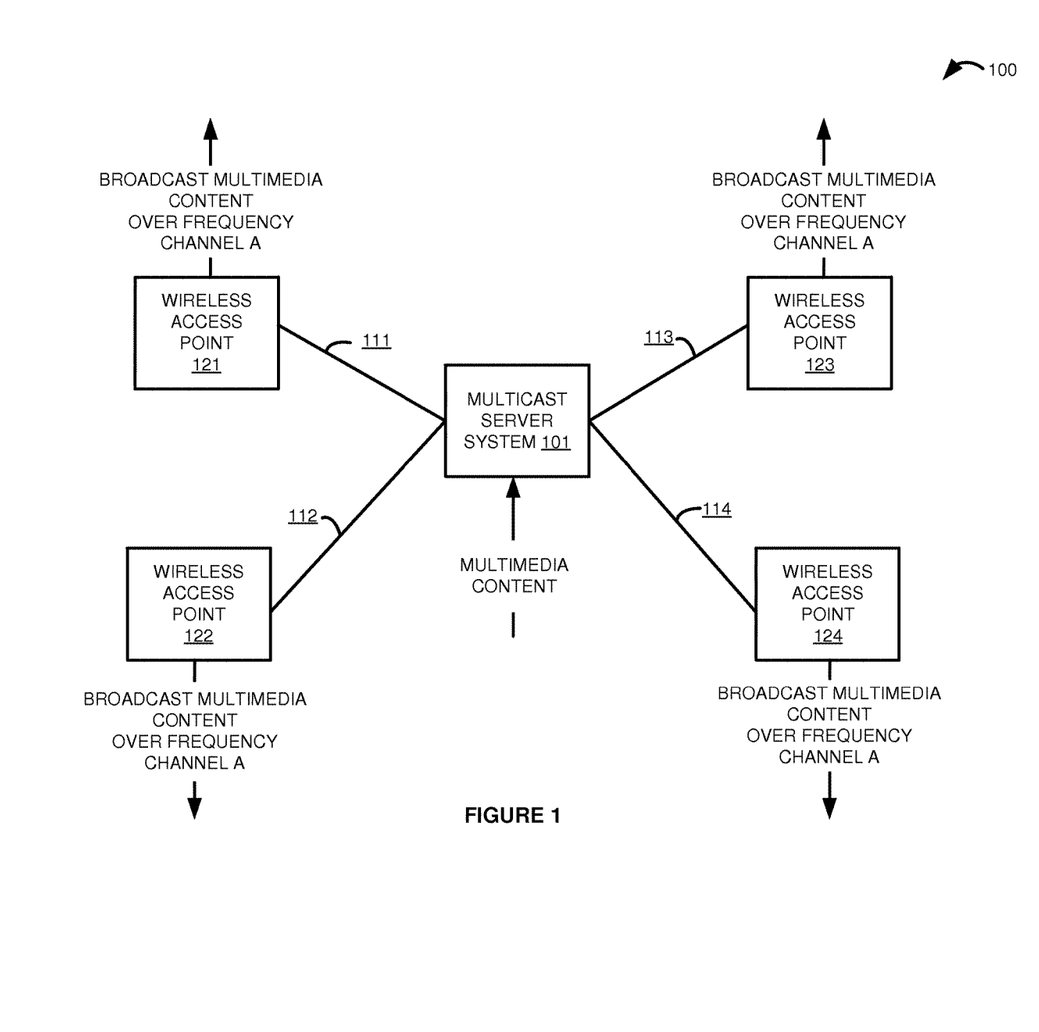
FIG. 1 illustrates a wireless communication system to provide buffering in a Single Frequency Network (SFN).

FIG. 1 illustrates wireless communication system 100 to provide buffering in a Single Frequency Network (SFN). Wireless communication system 100 includes multicast server system 101 and wireless access points 121-124. Multicast server system 101 communicates with wireless access points 121-124 over communication links 111-114, respectively. Communication links 111-114 may use protocols like Time Division Multiplex (TDM), Internet Protocol (IP), Ethernet, Long Term Evolution (LTE), Data over Cable Service Interface Specification (DOCSIS), or some other communication protocol—including combinations thereof. Wireless communication system 100 may include other components not shown for clarity.

In some examples, the SFN comprises a Multimedia Broadcast Multicast Service (MBMS). Examples of multicast server system 101 include a Multicast Coordination Entity (MCE) and a MBMS Gateway (M-GW). Examples of wireless access points 121-124 include base stations, base transceiver stations, femtocell base stations, eNodeBs, WIFI hotspots, WIFI access points, and/or other wireless access nodes—including combinations thereof.

In operation, multicast server system 101 transmits multimedia content to wireless access points 121-124. Wireless access points 121-124 broadcast the multimedia content at the same time over the same frequency channel. For example, multimedia content could comprise live video or audio streaming (news, weather, sports, concerts, etc.). In other examples, the multimedia content could be a software update. In yet another example, the multimedia content may be an alert, such as a weather or amber alert.

Wireless access points 121-124 determine and transmit SFN transmit time information to multicast server system 101. In some examples, SFN transmit time information includes buffer status information, a buffer status report (BSR), propagation delay information, backhaul delay information, frame transmission information, error rates, and/or other timing information—including combinations thereof. In an SFN, the transmission needs to be synchronized, however transmission delay may cause the wireless access points to become unsynchronized. In some examples, transmission delay is in the core network, for instance, from the content provider to the wireless communication network. In other examples, the transmission delay may be in the backhaul connection between the wireless access points and the communication network. In yet other examples, the transmission delay may be the wireless access points themselves. In another example, the transmission delay may be caused by the distance between the wireless access point and the multicast server system.

Multicast server system 101 uses the SFN transmit time information to determine individual buffering information for each of the wireless access points. The multicast server system adjusts a buffer delay for each individual wireless access point 121-124 using the individual buffering information determined for each wireless access point 121-124. Multicast server system 101 transmits the multimedia content to wireless access points 121-124. In some examples adjusting the buffer delay speeds up transmission (i.e. decreasing the buffer). In other examples, adjusting the buffer delay slows down transmission (i.e. increasing the buffer).

Figure 2:
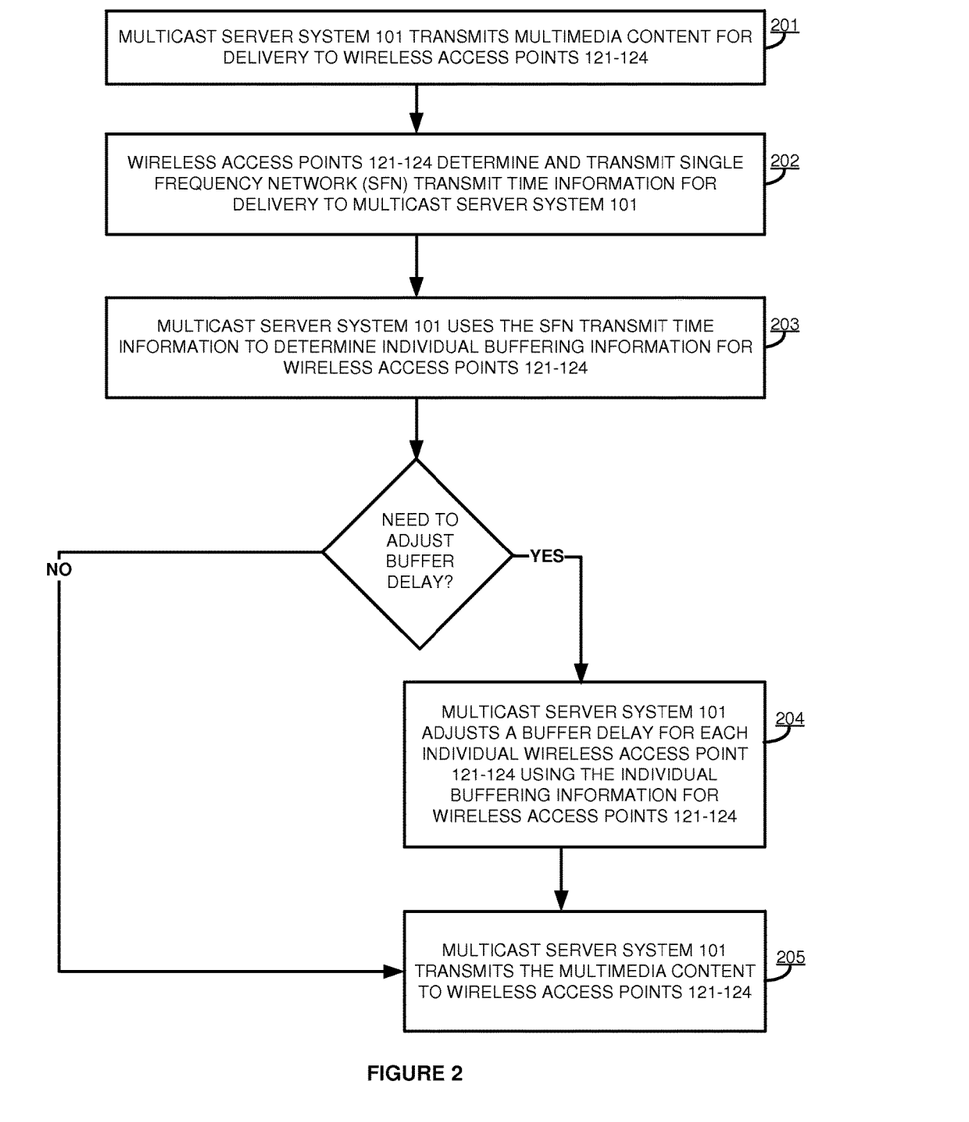
FIG. 2 illustrates the operation of the wireless communication system to provide buffering in the SFN.

FIG. 2 illustrates the operation of wireless communication system 100 to provide buffering in an SFN. Multicast server system 101 transmits multimedia content to wireless access points 121-124 (201). For example, the multimedia content may be transmitted in data packets or data blocks. Although not required, each data packet may be time stamped by multicast server system 101 with a packet transmission time.

Wireless access points 121-124 determine and transmit SFN transmit time information to multicast server system 101 (202). In some examples, wireless access points 121-124 may track the time of receipt for each data packet received. Although not required, multicast server system 101 may determine SFN transit time information.

The wireless access points 121-124 may previously have synchronized their clocks, so that the timing information would be synchronized. Although not required, wireless access points 121-124 may also periodically synchronized their clocks. In some examples, SFN transmit time information may include the timestamp of when a data packet was received by the wireless access point. In other examples, the SFN transmit time information may be the timestamp of when a data packet was transmitted from the wireless access point.

Multicast server system 101 uses the SFN transmit time information to determine individual buffering information for wireless access points 121-124 (203). Multicast server system 101 adjusts a buffer delay for each individual wireless access point 121-124 using the individual buffering information for each wireless access point 121-124 (204). In some examples, each wireless access point 121 may have a different buffer delay. In some cases, wireless access points 121-124 are all synchronized and there is no need to adjust the individual buffer delays.

However, if wireless access points 121-124 are not synchronized, it may be necessary to adjust the individual buffer delays. For example, wireless access point 121 may be transmitting earlier than the other wireless access points in the SFN. Transmission of the multimedia content from the wireless access point 121 may need to be delayed. Multicast server system 101 may increase the buffer delay for wireless access point 121 and not change the buffer delay for wireless access points 122-124. In another example, wireless access point 124 may be transmitting later than wireless access points 121-123, multicast server system 101 may decrease the buffer delay for wireless access point 124. In some examples, an individual buffer delay may be increased and another individual buffer delay may be decreased. Although not required, an unsynchronized wireless access point may be removed from the SFN.

Although not required, multicast server system 101 may transfer the individual buffering information for delivery to wireless access points 121-124; and wireless access points 121-124 may use the individual buffering information to synchronize transmission of the multimedia content. Multicast server system 101 transmits the multimedia content to wireless access points 121-124 (205).

Periodically during the transmission of the multimedia content, multicast server system 101 may check the synchronization of wireless access points 121-124. Multicast server system 101 transfer an SFN transmit time information request to wireless access points 121-124. Wireless access points 121-124 determine updated SFN transmit time information for delivery to multicast server system 101. Multicast server system 101 uses the updated SFN transmit time information to determine updated buffering information for each wireless access point 121-124.

Multicast server system 101 uses the updated buffering information to determine whether the individual buffer delays for each individual wireless access point 121-124 needs to updated/changed. In some examples, the SFN transmit time information request is sent after a specified amount of time. Although not required, multicast server system 101 may periodically transmit a SFN transmit time information request to all wireless access points (active and not active) that are part of the SFN.

Figure 3:
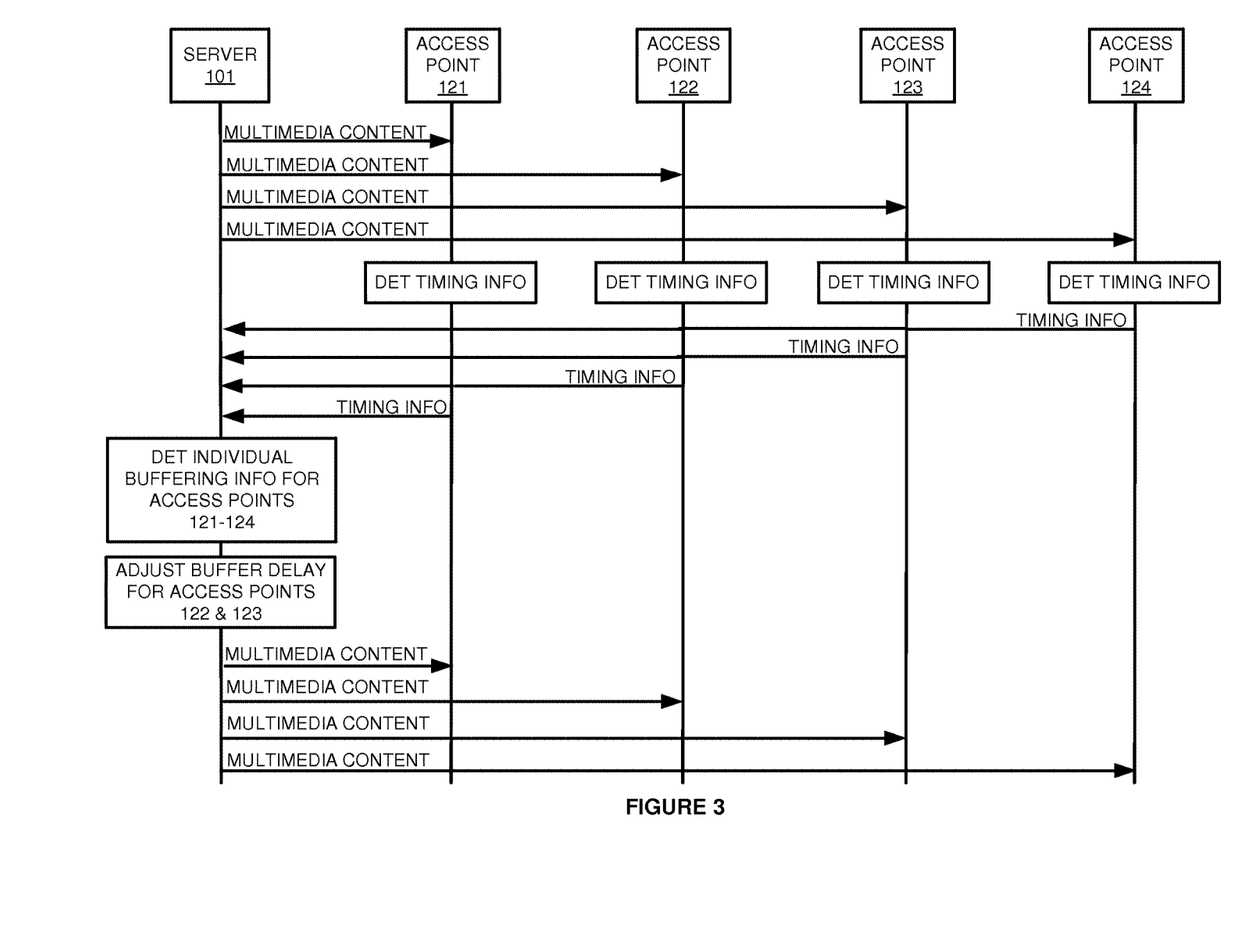
FIG. 3 illustrates the operation of the wireless communication system to provide buffering in the SFN.

FIG. 3 illustrates the operation of wireless communication system 100 to provide buffering in an SFN. Multicast server system 101 transmits multimedia content to wireless access points 121-124. Wireless access points 121-124 determine and transmit SFN transmit time information to multicast server system 101. Multicast server system 101 uses the SFN transmit time information to determine individual buffering information for each wireless access point 121-124. Multicast server system 101 adjusts an individual buffer delay for each individual wireless access point 121-124, using the individual buffering information determined for each wireless access point 121-124. Multicast server system 101 transmits the multimedia content to wireless access points 121-124.

In this example, multicast server system 101 uses the SFN transmit time information transferred from wireless access point 122 to determine buffering information for wireless access point 122. The buffering information for wireless access point 122 may indicate that wireless access point is transmitting earlier than the other wireless access points. In order to synchronize the transmission, multicast server system 101 increases the buffer delay to wireless access point 122. Although not required, additional multicast server systems may be added to increase the coverage area or reduce delay caused by distance between the multicast server systems and the wireless access points.

Figure 4:
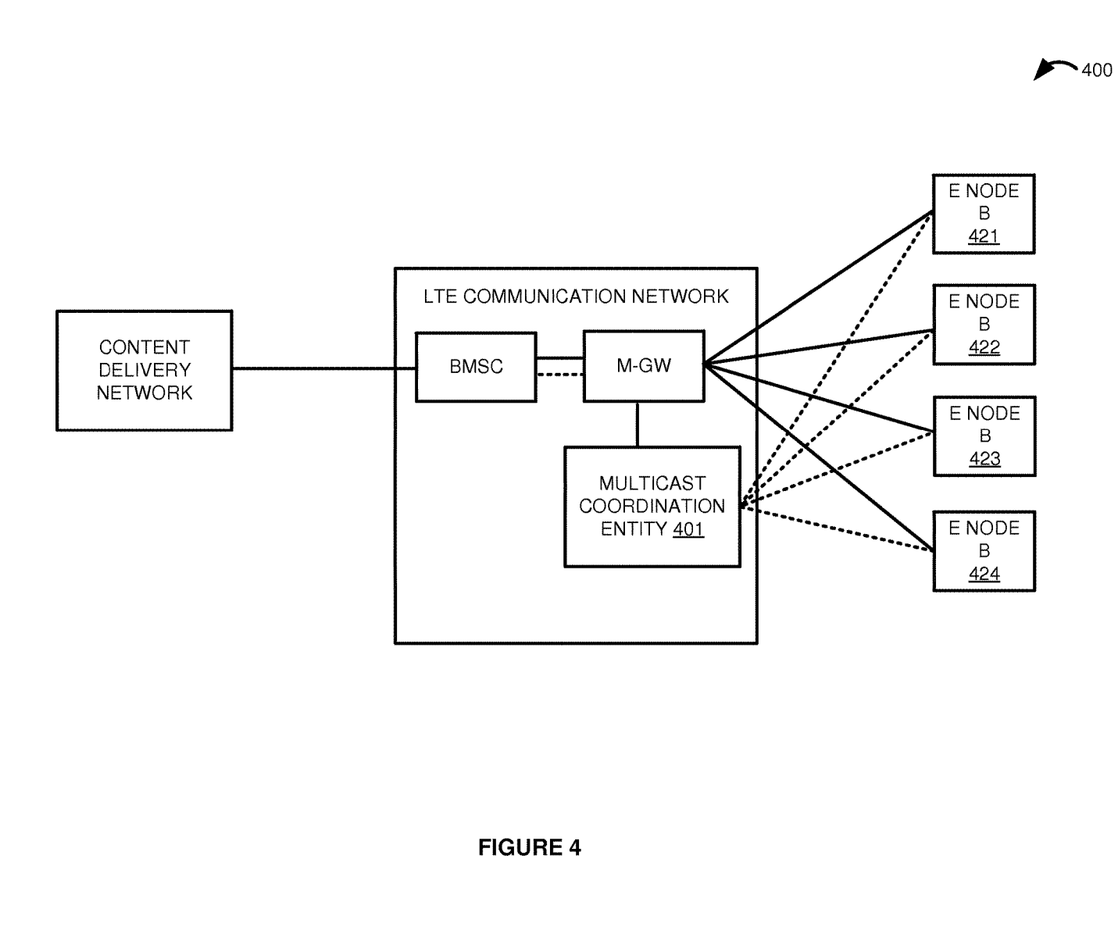
FIG. 4 illustrates a wireless communication system to provide buffering in an SFN.

FIG. 4 illustrates wireless communication system 400 to provide buffering in a Single Frequency Network (SFN). Wireless communication system 400 includes a Content Delivery Network (CDN), an LTE communication network, and eNodeBs 421-424. The LTE communication network includes a Broadcast Multicast Service Center (BMSC), a MBMS Gateway (M-GW), and Multicast Coordination Entity (MCE) 401. Although shown as a separate entity, MCE 401 could be integrated into the M-GW or eNodeBs 421-424. Other elements of the LTE communication network such as a Serving Gateway (S-GW) and a Mobility Management Entity (MME) have been omitted for clarity.

In operation, a content provider transmits multimedia content to eNodeBs 421-424 over the LTE communication network. ENodeBs 421-424 determine and transfer SFN transmit time information for delivery to Multicast Coordination Entity (MCE) 401. Although not required, the data and signaling may be transmitted over different links. In this example, the data link is shown in a solid line and the signaling link is indicated with a dashed line.

MCE 401 uses the SFN transmit time information to determine individual buffering information for each eNodeB 421-424. For example, SFN transmit time information may include packet transmission time, packet receipt time, buffer status information, a buffer status report, propagation delay information, backhaul delay information, frame transmission information, error rates, and/or other timing information—including combinations thereof.

Although not required, MCE 401 may process the SFN transmit time information transferred from each eNodeB 421-424 to determine an average SFN transmit time for all eNodeBs. Although use of an average SFN transmit time is discussed, other calculations or statistically measures, such as standard deviation may be used to determine the synchronicity of the eNodeBs.

For instance, if eNodeB 421 transmitted the data packet at time_1, eNodeB 422 transmitted the data packet at time_2, eNodeB 423 transmitted the data packet at time_3, and eNodeB 424 transmitted the data packet at time_4. The average SFN transmit time would be:

$$SFN\ transmit\ time = \frac{(time\_1 + time\_2 + time\_3 + time\_4)}{4}$$

Using the average SFN transmit time MCE 401 may determine whether each individual eNodeB 421-424 is within a threshold time of the average SFN transmit time. In some examples, if the eNodeB is within a threshold time of the average SFN transmit time, the eNodeB will be considered synchronized. If the eNodeB is not within the threshold, the eNodeB may need to be synchronized. In some examples, the unsynchronized eNodeB may be temporarily or permanently removed from the SFN.

Multicast server system 401 adjusts an individual buffer delay for each unsynchronized eNodeB using the individual buffering information. For example, the SFN transmit time for eNodeB 424 may be earlier than the other eNodeBs. MCE 401 increases the buffer delay for eNodeB 424 (i.e. slow-down or delay transmission) in order to synchronize eNodeB 424 with the other eNodeBs.

In another example, the SFN transmit time for eNodeB 424 may be later than the other eNodeBs. MCE 401 decreases the buffer delay for eNodeB 424 (i.e. speed up transmission) in order to synchronize eNodeB 424 with the other eNodeBs. Note there may be a default buffer to all eNodeBs, in order to allow the buffer delay to be decreased.

By adjusting the buffer delay, MCE 401 can synchronize the transmission time for a data packet for all eNodeBs in the SFN. Transmission time may be affected by backhaul delays, base station load, buffer fill, etc. MCE 401 transmits the multimedia content to eNodeBs 421-424.

Figure 5:
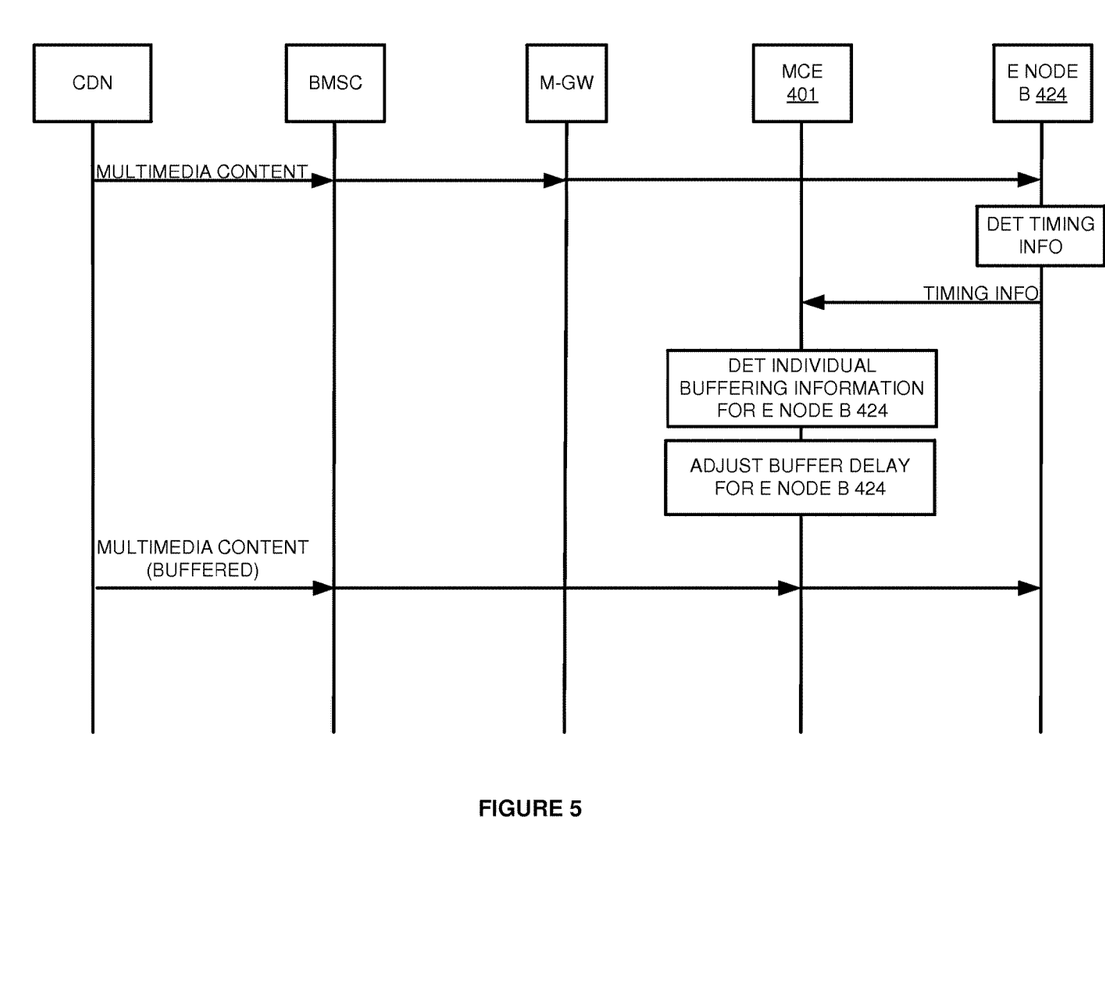
FIG. 5 illustrates the operation of the wireless communication system to provide buffering in the SFN.

FIG. 5 illustrates the operation of wireless communication system 400 to provide buffering in an SFN. A content provider transmits multimedia content to eNodeB 424 over the LTE communication network. ENodeB 424 determines and transmits SFN transmit time information to MCE 401. Although not required, MCE 401 may determine the SFN transmit time information rather than receiving it from eNodeB 424.

MCE 401 uses the SFN transmit time information to determine individual buffering information for eNodeB 424. MCE 401 adjusts a buffer delay for eNodeB 424 using the individual buffering information for eNodeB 424. MCE 401 transmits the multimedia content to eNodeB 424.

Figure 6:
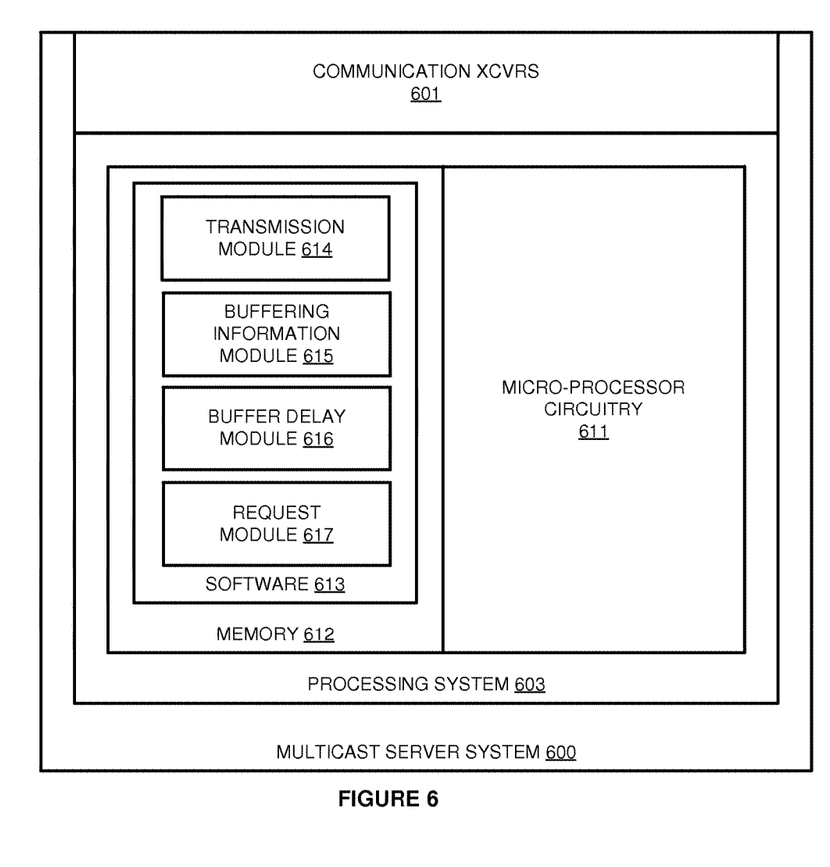
FIG. 6 illustrates an example of a multicast server system to provide buffering in an SFN.

FIG. 6 illustrates multicast server system 600 to provide buffering in an SFN. Multicast server system 600 is an example of multicast server system 101 and multicast coordination entity 401, although multicast server system 101 and multicast coordination entity 401 may use alternative configurations. Multicast server system 600 could be a discrete system, a distributed system, and/or could be integrated into other systems.

Multicast server system 600 comprises communication transceivers 601 and processing system 603. Processing system 603 comprises processor circuitry 611 and memory 612 that stores operating software 613. Software 613 includes transmission module 614, buffering information module 615, buffer delay module 616, and request module 617. Processing system 603 is linked to communication transceivers 601. Multicast server system 600 may include other well-known components that are not shown for clarity, such as, servers, computer systems, databases, and power systems.

Communication transceivers 601 comprise a physical communication port, signal processing circuitry, software, and/or some other communication components. Communication transceivers 601 may use various protocols, such as IP, TDM, Ethernet, wireless, or some other network communication format—including combinations thereof. Communication transceivers 601 exchange signaling and other control data with communication nodes as described herein.

Processor circuitry 611 comprises microprocessor and other circuitry that retrieves and executes operating software 613 from memory 612. Memory 612 comprises a non-transitory computer-readable storage medium, such as a disk drive, flash drive, data storage circuitry, or some other memory apparatus. Memory system 612 could be a single device or be distributed across multiple devices. Processor circuitry 611 is typically mounted on one or more circuit boards that may also hold memory 612 and portions of communication transceivers 601.

Operating software 613 comprises computer programs, firmware, or some other form of computer-readable processing instructions. Operating software 613 may include an operating system, utilities, drivers, network interfaces, applications, or some other type of software. When executed by processor circuitry 611, software 613 directs processing system 603 to operate multicast server system 600 as described herein. In particular, transmission module 614 directs processing system 603 to transmit multimedia content for delivery to the wireless access points. Buffering information module 615 directs processing system 603 to use the SFN transmit time information received from each wireless access point to determine individual buffering information for each wireless access point. Buffer delay module 616 directs processing system 603 to use the individual buffering information for each wireless access point to adjust a buffer delay for each individual wireless access point. Request module 617 directs processing system 603 to transfer an SFN transmit time information request for delivery to the wireless access points. The request may be sent periodically to all wireless access point receiving the multimedia content.

Referring back to FIG. 1, wireless access points 121-124 comprise RF communication circuitry and an antenna. The RF communication circuitry typically includes an amplifier, filter, RF modulator, and signal processing circuitry. Wireless access points 121-124 may also comprise a router, server, memory device, software, processing circuitry, cabling, power supply, network communication interface, structural support, or some other communication apparatus. Wireless access points 121-124 could be a base station, base transceiver station, eNodeB, Internet access node, telephony service node, wireless data access point, or some other wireless communication system—including combinations thereof. Wireless access points 121-124 comprise network elements that provide communications services to wireless communication devices. Wireless access points 121-124 may comprise switches, wireless access nodes, Internet routers, network gateways, application servers, computer systems, communication links, or some other type of communication equipment—including combinations thereof.

Multicast server system 101 comprises a computer system and communication interface. Multicast server system 101 may also include other components such as a router, server, data storage system, and power supply. Multicast server system 101 may reside in a single device or may be distributed across multiple devices. Multicast server system 101 is shown externally to wireless access points 121-124, but multicast server system 101 could be integrated within the components of wireless access points 121-124. Multicast server system 101 could be a mobile switching center, network gateway system, Internet access node, application server, service node, or some other communication system—including combinations thereof.

Communication links 111-114 use metal, glass, air, space, or some other material as the transport media. Communication links 111-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-114 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to synchronize a Single Frequency Network (SFN), the method comprising:
   a multicast wireless access point transmitting multimedia content for delivery to other wireless access points;
   the multicast wireless access point and the other wireless access points wirelessly transmitting the multimedia content to user equipment;
   the other wireless access points determining and transmitting SFN transmit time information for delivery to the multicast wireless access point;
   the multicast wireless access point determining an average SFN transmit time based on the SFN transmit time information and transferring the average SFN transmit time for delivery to the other wireless access points; and
   one of the other wireless access points stopping the wireless transmission of the multimedia content to the user equipment when the one of the other wireless access points is not transmitting within the average SFN transmit time.

2. The method of claim 1 wherein the SFN comprises a Multimedia Broadcast Multicast Service (MBMS).

3. The method of claim 1 further comprising:
   the multicast wireless access point transferring a SFN transmit time information request for delivery to the other wireless access points;
   in response to the SFN transmit time information request, the other wireless access points transferring updated SFN transmit time information for delivery to the multicast wireless access point.

4. The method of claim 1 wherein the other wireless access points comprise Wireless Fidelity (WIFI) wireless access points.

5. The method of claim 1 wherein the other wireless access points comprise femtocell base stations.

6. The method of claim 1 wherein other wireless access points comprise Long-Term Evolution (LTE) eNodeBs.

7. The method of claim 1 wherein the wireless communication network comprises a Long-Term Evolution (LTE) network.

8. A wireless communication system to synchronize a Single Frequency Network (SFN), the wireless communication system comprising:
   a multicast wireless access point configured to transmit multimedia content for delivery to other wireless access points;
   the multicast wireless access point and the other wireless access points configured to wirelessly transmit the multimedia content to user equipment;
   the other wireless access points configured to determine and transmit SFN transmit time information for delivery to the multicast wireless access point;
   the multicast wireless access point determining an average SFN transmit time based on the SFN transmit time information and transferring the average SFN transmit time for delivery to the other wireless access points; and one of the other wireless access points configured to stop the wireless transmission of the multimedia content to the user equipment when the one of the other wireless access points is not transmitting within the average SFN transmit time.

9. The wireless communication system of claim 8 wherein the SFN comprises a Multimedia Broadcast Multicast Service (MBMS).

10. The wireless communication system of claim 8 wherein the other wireless access points comprise Wireless Fidelity (WIFI) wireless access points.

11. The wireless communication system of claim 8 wherein the other wireless access points comprise Long-Term Evolution (LTE) eNodeBs.

12. The wireless communication system of claim 8 wherein the wireless communication network comprises a Long-Term Evolution (LTE) network.

* * * * *